(12) United States Patent
Pulleyblank et al.

(10) Patent No.: US 11,130,376 B2
(45) Date of Patent: Sep. 28, 2021

(54) ACCESSORY ASSEMBLY FOR A BUMPER REGION OF A VEHICLE AND A VEHICLE BUMPER ACCESSORY ASSEMBLY

(71) Applicant: GM GLOBAL TECHNOLOGY OPERATIONS LLC, Detroit, MI (US)

(72) Inventors: Mark Pulleyblank, Harrison Township, MI (US); Thomas P. Grabowski, Shelby Township, MI (US); Leroy R. Talley, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 225 days.

(21) Appl. No.: 16/444,655

(22) Filed: Jun. 18, 2019

(65) Prior Publication Data
US 2020/0398775 A1 Dec. 24, 2020

(51) Int. Cl.
*B60D 1/56* (2006.01)
*B60D 1/54* (2006.01)
*B60D 3/00* (2006.01)

(52) U.S. Cl.
CPC .............. *B60D 1/565* (2013.01); *B60D 1/54* (2013.01); *B60D 3/00* (2013.01)

(58) Field of Classification Search
CPC .......... B60D 1/565; B60D 1/56; B60D 1/605; B60D 3/00
See application file for complete search history.

(56) References Cited

U.S. PATENT DOCUMENTS

| | | | | |
|---|---|---|---|---|
| 2,510,782 A | * | 6/1950 | Johnson .................... | B60D 1/60 280/502 |
| 2,671,675 A | * | 3/1954 | Swaisgood ............. | B60R 19/44 280/507 |
| 4,852,902 A | * | 8/1989 | Young ...................... | B60D 1/60 280/507 |
| 6,322,094 B1 | * | 11/2001 | Poe .......................... | B60D 1/60 280/507 |
| 6,969,084 B2 | * | 11/2005 | Kaepp .................... | B60D 1/485 280/500 |
| 2020/0070603 A1 | * | 3/2020 | Greggs .................. | B60D 1/488 |

* cited by examiner

*Primary Examiner* — Kevin Hurley
(74) *Attorney, Agent, or Firm* — Quinn IP Law

(57) ABSTRACT

An accessory assembly for a bumper region of a vehicle includes a support disposed in the bumper region, and an accessory mounted to the support. The accessory is accessible from the bumper region. The accessory assembly includes a cover attached to the accessory to conceal the accessory in a use position, and the cover is detachable from the accessory to provide access to the accessory in a removed position. A vehicle bumper accessory assembly includes a bumper defining an accessory region, and the support disposed in the accessory region of the bumper. The vehicle bumper accessory assembly includes the accessory that is accessible outside of the bumper. The vehicle bumper accessory assembly includes the cover attached to the accessory to conceal the accessory when the accessory is not in use, and the cover is detachable from the accessory to provide access to use the accessory.

20 Claims, 3 Drawing Sheets

ACCESSORY ASSEMBLY FOR A BUMPER REGION OF A VEHICLE AND A VEHICLE BUMPER ACCESSORY ASSEMBLY

INTRODUCTION

Vehicles may optionally be designed with tow hooks which provide a structure to hook to in order to tow the vehicle, if, for example, the vehicle is stuck. The tow hooks are visible from outside of a bumper of the vehicle, which may be visually undesirable.

SUMMARY

The present disclosure provides an accessory assembly for a bumper region of a vehicle. The accessory assembly includes a support disposed in the bumper region, and an accessory mounted to the support. The accessory is accessible from the bumper region. The accessory assembly further includes a cover attached to the accessory to conceal the accessory in a use position, and the cover is detachable from the accessory to provide access to the accessory in a removed position.

The accessory assembly optionally includes one or more of the following:
A) the accessory includes a nudge bar;
B) the nudge bar is fixed to the support;
C) the cover conceals the nudge bar when in the use position;
D) the support includes a first attachment portion, and the nudge bar is fixed to the support at the first attachment portion;
E) the accessory includes a tow hook;
F) the tow hook is attached to the support;
G) the cover conceals the tow hook when in the use position;
H) the support includes a second attachment portion spaced from the first attachment portion, and the tow hook is attached to the support at the second attachment portion;
I) the tow hook includes an attachment end and a loop that extends outwardly from the attachment end;
J) the tow hook is attached to the support at the attachment end;
K) the nudge bar includes an outer side and an inner side opposing the outer side;
L) the support and the nudge bar are fixed together along the inner side;
M) the tow hook is disposed along the outer side of the nudge bar;
N) the tow hook is disposed adjacent to the outer side of the nudge bar when the tow hook is in a retracted position, and the tow hook is movable away from the outer side of the nudge bar when the cover is in the removed position such that the tow hook is in a deployed position;
O) the cover includes a first cover attachment feature, and the accessory includes a first accessory attachment feature, and the first cover attachment feature and the first accessory attachment feature engage each other to secure the cover to the accessory;
P) the cover includes a second cover attachment feature spaced from the first cover attachment feature, and the accessory includes a second accessory attachment feature spaced from the first accessory attachment feature, and the second cover attachment feature and the second accessory attachment feature engage each other to secure the cover to the accessory;
Q) the first cover attachment feature of the cover includes a tab, and the first accessory attachment feature of the accessory defines a first recess;
R) the tab engages the accessory in the first recess when the cover is in the use position;
S) the second cover attachment feature of the cover includes a protrusion, and the second accessory attachment feature of the accessory defines a second recess;
T) the protrusion engages the accessory in the second recess when the cover is in the use position;
U) the nudge bar includes a proximal end fixed to the support and a distal end spaced from the support;
V) the distal end of the nudge bar defines the first recess, and the proximal end of the nudge bar defines the second recess;
W) the tow hook includes a loop defining an opening;
X) the protrusion of the cover is disposed through the opening when the cover is in the use position;
Y) the cover defines a pocket that conceals both of the nudge bar and the tow hook when in the use position;
Z) the cover includes an external side and an internal side opposing the external side;
AA) the internal side defines the pocket;
BB) the first and second cover attachment features protrude into the pocket when the cover is in the use position;
CC) the tab protrudes in a first direction to a distal point inside the pocket;
DD) the protrusion protrudes in a second direction to a distal point inside the pocket; and
EE) the first and second directions are different from each other.

The present disclosure also provides a vehicle bumper accessory assembly that includes a bumper defining an accessory region, and a support disposed in the accessory region of the bumper. The vehicle bumper accessory assembly includes an accessory mounted to the support, and the accessory is accessible outside of the bumper. The vehicle bumper accessory assembly also includes a cover attached to the accessory in a use position to conceal the accessory when the accessory is not in use, and the cover is detachable from the accessory in a removed position to reveal the accessory and provide access to use the accessory.

The vehicle bumper accessory assembly optionally includes one or more of the following:
A) the cover includes a tab and a protrusion spaced from each other;
B) the accessory defines a first recess and a second recess spaced from each other;
C) the tab engages the accessory in the first recess when the cover is in the use position;
D) the protrusion engages the accessory in the second recess when the cover is in the use position;
E) the accessory includes a nudge bar fixed to the support;
F) the accessory includes a tow hook attached to the support; and
G) the cover defines a pocket that conceals both of the nudge bar and the tow hook when in the use position.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
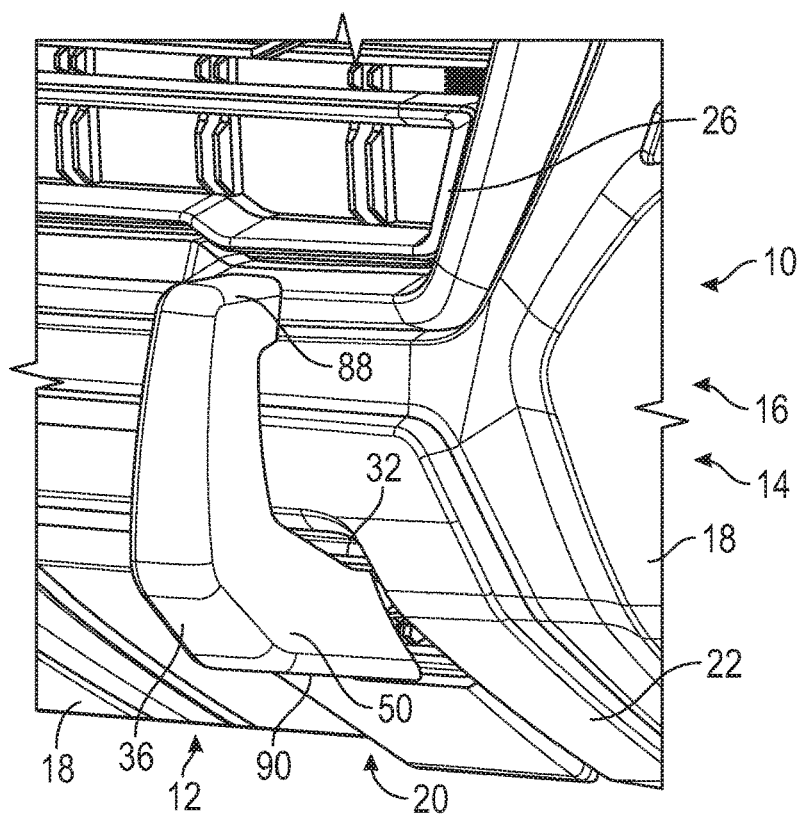
FIG. 1 is a schematic perspective view of part of a vehicle, with an accessory assembly for a bumper region of the vehicle and a vehicle bumper accessory assembly including a cover in a use position.
Figure 2:
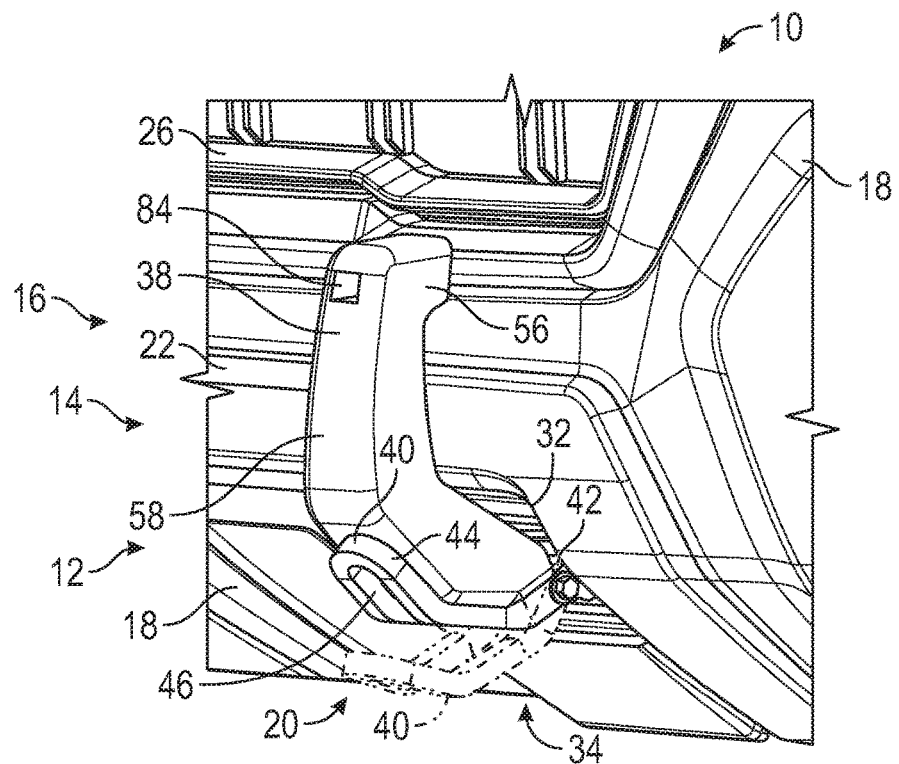
FIG. 2 is a schematic perspective view of the accessory assembly and the vehicle bumper accessory assembly with the cover in a removed position to uncover a nudge bar and a tow hook, and with the tow hook in a retracted position in solid lines and the tow hook in a deployed position in phantom lines.

Referring to the FIGS., wherein like numerals indicate like or corresponding parts throughout the several views, part of a vehicle 10 is generally shown in FIGS. 1 and 2. FIG. 1 also illustrates an accessory assembly 12 for a bumper region 14 of the vehicle 10, and a vehicle bumper accessory assembly 16.

The vehicle 10 that may utilize the accessory assembly 12 and/or the vehicle bumper accessory assembly 16 may be an automotive vehicle, such as, a car, a truck, an off-road vehicle, an all-terrain vehicle, etc. It is to be appreciated that the vehicle 10 may alternatively be a non-automotive vehicle, such as, a farm vehicle, a marine vehicle, an aviation vehicle, etc. Furthermore, the vehicle 10 may be a hybrid vehicle, an electric vehicle, a traditional gasoline vehicle, or any other suitable moveable platform utilizing the accessory assembly 12 and/or the vehicle bumper accessory assembly 16 disclosed herein.

Referring to FIGS. 1 and 2, the vehicle bumper accessory assembly 16 includes a bumper 18 defining an accessory region 20. In certain configurations, the bumper 18 may be a front bumper of the vehicle 10. In other configurations, the bumper 18 may be a rear bumper of the vehicle 10. Generally, the front bumper 18 may be disposed at a front end of the vehicle 10, in a direction that the vehicle 10 may move when in a drive gear, and the rear bumper 18 may be disposed at a rear end of the vehicle 10, in a direction that the vehicle 10 may move when in a reverse gear. The bumper region 14 for the accessory assembly 12 may include the bumper 18 and any area adjacent to the bumper 18.

Figure 3:
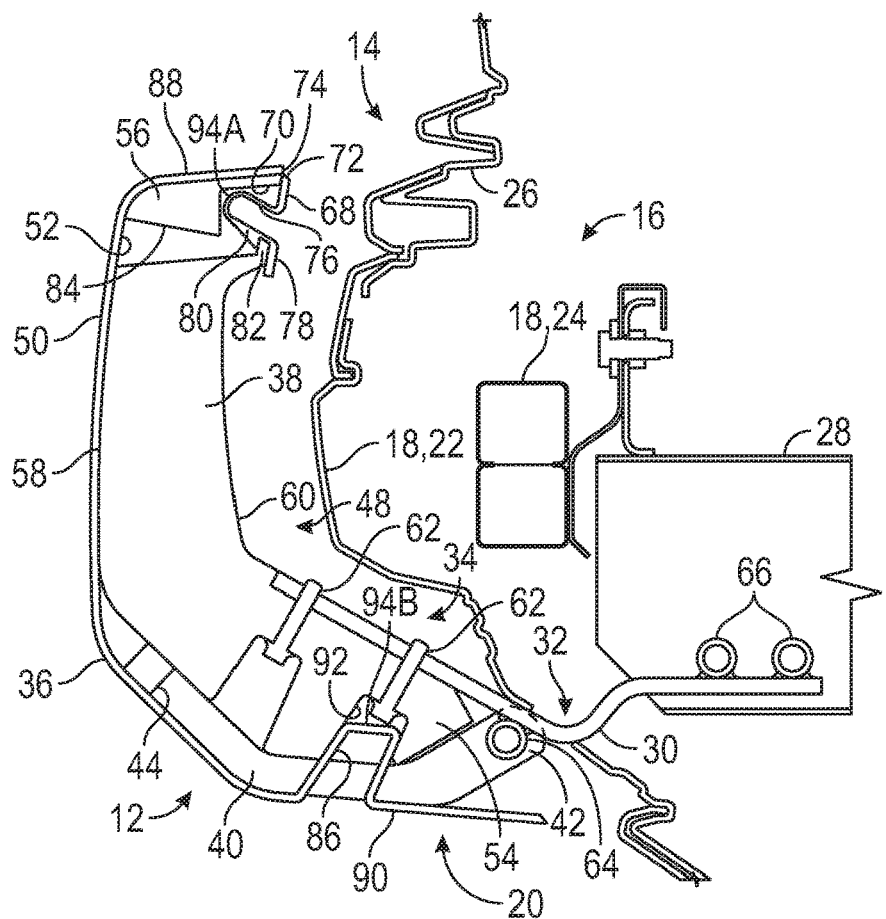
FIG. 3 is a schematic cross-sectional view of the vehicle, the accessory assembly and the vehicle bumper accessory assembly with the cover in the use position and the tow hook in the retracted position.

Referring to FIGS. 1-3, the bumper 18 may include a fascia 22 and a cross-bar 24 that is covered or concealed via the fascia 22. The fascia 22 provides an aesthetic appearance to an outside of the vehicle 10. The cross-bar 24 provides a structure to absorb energy when a force is applied to the bumper 18. The cross-bar 24 is elongated across the vehicle 10 in a cross-car direction. The cross-car direction may be across the vehicle 10 relative to side doors of the vehicle 10. Optionally, a grille 26 may be disposed above the bumper 18.

Referring to FIG. 3, a frame 28 supports the cross-bar 24. Therefore, the cross-bar 24 is fixed to the frame 28, and when the force is applied to the cross-bar 24, that force is then directed to the frame 28. The frame 28 may include one or more of a chassis, a rail, a support structure, a bracket, a cradle, or any other suitable structure.

As best shown in FIG. 3, the accessory assembly 12 includes a support 30 disposed in the bumper region 14. More specifically, the support 30 is disposed in the accessory region 20 of the bumper 18. The support 30 is fixed to the frame 28, and a portion of the support 30 is accessible in the accessory region 20. Therefore, the support 30 may extend outside of the bumper 18. As such, the bumper 18, and more specifically the fascia 22, may define an aperture 32, and the support 30 is disposed through the aperture 32 of the bumper 18. The support 30 may be any suitable configuration. The support 30 may include one or more of a bracket, a frame, a mount, or any other support structure. Furthermore, the support 30 may be fixed to the frame 28 by any suitable methods, and non-limiting examples may include one or more fasteners, bolts, screws, clips, welding, etc.

Referring to FIGS. 2-5, the accessory assembly 12 also includes an accessory 34 mounted to the support 30. Specifically, the accessory 34 is disposed along the accessory region 20 of the bumper 18. Furthermore, the accessory 34 is accessible from the bumper region 14. More specifically, the accessory 34 is mounted to the support 30, and the accessory 34 is accessible outside of the bumper 18. In other words, the accessory 34 is visible from the bumper region 14. Additionally, the accessory 34 is spaced from the bumper 18, and specifically, the fascia 22, which will be discussed further below.

It is to be appreciated that more than one accessory assembly 12 may be used, and thus, more than one accessory 34 may be spaced from each other across the bumper 18. Therefore, as one example, one accessory 34 may be disposed along the bumper 18 relative to a driver's side of the vehicle 10, and another accessory 34 may be disposed along the bumper 18 relative to a passenger side of the vehicle 10. The below discussion applies to any number of accessory assemblies 12 being used.

Referring to FIGS. 1 and 3-5, the accessory assembly 12 further includes a cover 36. The cover 36 is attached to the accessory 34 to conceal the accessory 34 in a use position (see FIGS. 1, 3, and 4). Therefore, the cover 36 is attached to the accessory 34 in the use position to conceal the accessory 34 when the accessory 34 is not in use. The cover 36 is detachable from the accessory 34 to provide access to the accessory 34 in a removed position (see FIG. 2). Therefore, the cover 36 is detachable from the accessory 34 in the removed position to reveal the accessory 34 and provide access to use the accessory 34.

The cover 36 provides an aesthetically pleasing appearance to the outside of the vehicle 10. Furthermore, the cover 36 provides a quick and easy way to deploy the accessory 34 when desired. Additionally, the cover 36 is easily replaceable if the cover 36 is damaged. It is to be appreciated that the vehicle bumper accessory assembly 16 may also include the support 30, the accessory 34, and the cover 36.

The accessory 34 may be various configurations, and the cover 36 may be various configurations depending on the configuration of the accessory 34. For example, the accessory 34 may include a nudge bar 38 fixed to the support 30.

The nudge bar 38 is disposed outside of the bumper 18, and is spaced from the bumper 18, and specifically the fascia 22, to provide protection to the bumper 18. For example, if a force is applied to the nudge bar 38, the nudge bar 38 may protect the fascia 22 from damage. Therefore, it is possible that solely the nudge bar 38 may need replacing after the force is applied thereto (and thus, no part of the bumper 18 may need replacing). The cover 36 conceals the nudge bar 38 when in use position. It is to be appreciated that the nudge bar 38 is usable regardless of whether the cover 36 is in the use position or the removed position.

As another example, the accessory 34 may include a tow hook 40 attached to the support 30. The tow hook 40 is disposed outside of the bumper 18, and is accessible from outside of the bumper 18 to provide a structure to hook to in order to tow the vehicle 10, if, for example, the vehicle 10 is stuck. The cover 36 conceals the tow hook 40 when in the use position. As best shown in FIGS. 2 and 3, the accessory 34 may include both of the nudge bar 38 and the tow hook 40.

Figure 5:
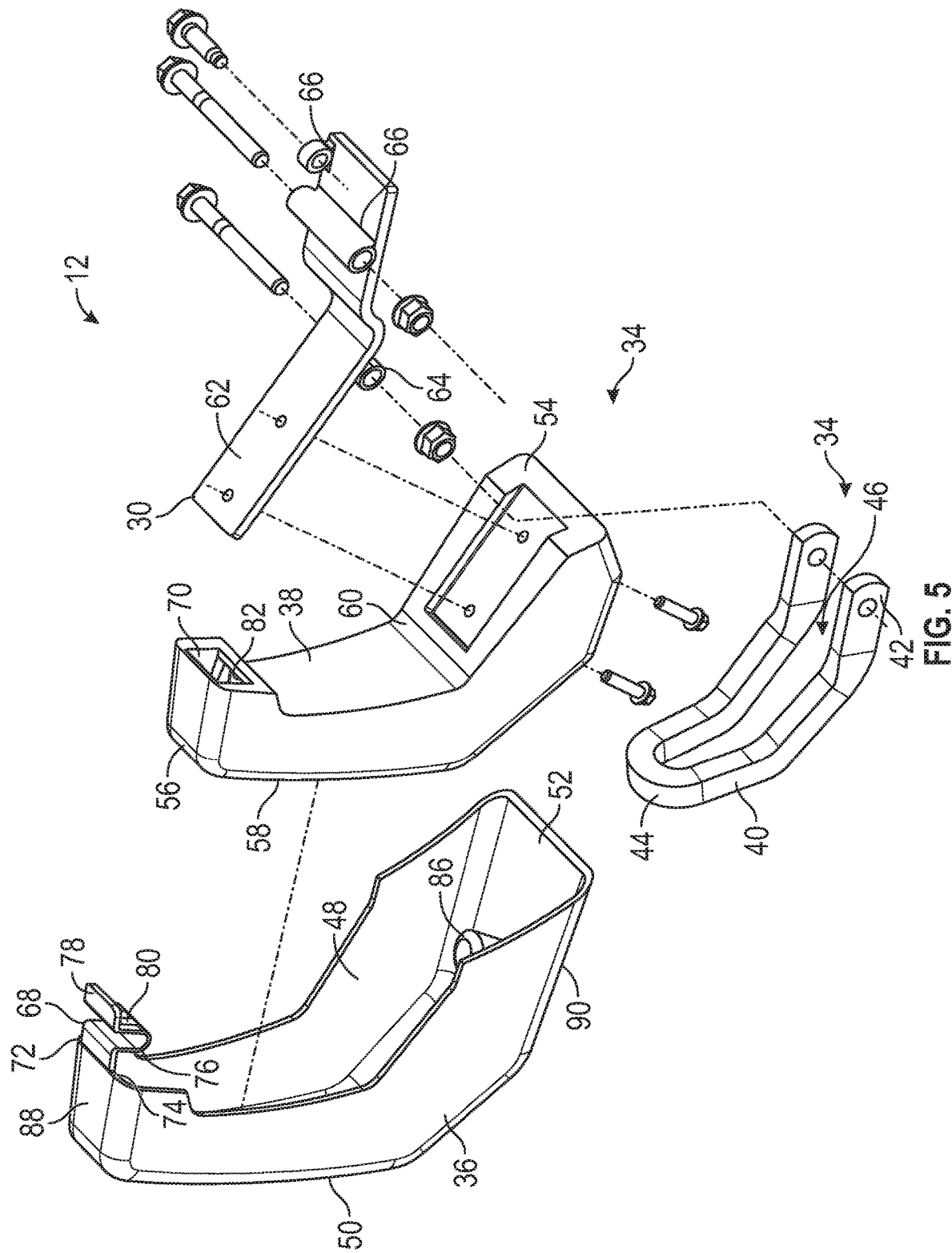
FIG. 5 is a schematic exploded perspective view of the components of FIG. 4.

As best shown in FIGS. 2 and 5, the tow hook 40 may include an attachment end 42 and a loop 44 that extends outwardly from the attachment end 42. The tow hook 40 is attached to the support 30 at the attachment end 42. The loop 44 of the tow hook 40 may define an opening 46. The opening 46 provides a location for a structure to hook to the tow hook 40.

Therefore, the cover 36 defines a pocket 48 that conceals the accessory 34 when in the use position. Specifically, the pocket 48 may conceal both of the nudge bar 38 and the tow hook 40 when in the use position. The pocket 48 is sized to contain both of the nudge bar 38 and the tow hook 40. Having the cover 36 conceal both the nudge bar 38 and the tow hook 40 provides an aesthetically pleasing appearance to the outside of the vehicle 10.

Referring to FIGS. 3 and 5, the cover 36 may include an external side 50 and an internal side 52 opposing the external side 50. In certain configurations, the internal side 52 defines the pocket 48, and the external side 50 presents a show surface when the cover 36 is in the use position. Therefore, the internal side 52 of the cover 36 conceals the nudge bar 38 and the tow hook 40 from being visible from outside of the vehicle 10. The external side 50 may generally conceal five sides of the accessory 34, such as, for example, a top side, a bottom side, a front side, a left side, and a right side.

Turning back to the nudge bar 38, referring to FIGS. 2-5, the nudge bar 38 is fixed to the support 30. Therefore, the nudge bar 38 is stationary. The nudge bar 38 may include a proximal end 54 fixed to the support 30 and a distal end 56 spaced from the support 30. Therefore, the nudge bar 38 is suspended in front of the bumper 18 via the support 30. The nudge bar 38 may be fixed to the support 30 by any suitable methods, and non-limiting examples may include one or more fasteners, bolts, screws, clips, welding, etc.

Additionally, the nudge bar 38 may include an outer side 58 and an inner side 60 opposing the outer side 58. In certain configurations, the support 30 and the nudge bar 38 are fixed together along the inner side 60. Additionally, the cover 36 is disposed over the outer side 58 of the nudge bar 38 when in the use position.

Furthermore, in certain configurations, the support 30 may include a first attachment portion 62, and the nudge bar 38 is fixed to the support 30 at the first attachment portion 62. It is to be appreciated that the nudge bar 38 may be fixed to the support 30 at any suitable location.

Turning back to the tow hook 40, referring to FIGS. 2-5, the tow hook 40 is attached to the support 30. Generally, the tow hook 40 is disposed along the outer side 58 of the nudge bar 38. As such, the tow hook 40 is accessible adjacent to the outer side 58 of the nudge bar 38. The tow hook 40 may be attached to the support 30 via any suitable methods, and non-limiting examples may include one or more fasteners, bolts, screws, clips, pivots, etc.

As best shown in FIG. 2, the tow hook 40 is movable relative to the support 30. The tow hook 40 is movable to be concealed behind the cover 36 when the cover 36 is in the use position. When the cover 36 is in the removed position, the tow hook 40 is movable away from the nudge bar 38 to deploy the tow hook 40. Specifically, the tow hook 40 is disposed in a retracted position (see FIG. 3, and the solid lines for the tow hook 40 in FIG. 2) when the tow hook 40 is adjacent to the nudge bar 38, and the tow hook 40 is movable away from the nudge bar 38 when the tow hook 40 is in a deployed position (see the phantom lines for the tow hook 40 in FIG. 2). In certain configurations, the tow hook 40 is disposed adjacent to the outer side 58 of the nudge bar 38 when the tow hook 40 is in the retracted position, and the tow hook 40 is movable away from the outer side 58 of the nudge bar 38 when the cover 36 is in the removed position such that the tow hook 40 is in the deployed position. For example, one side of the tow hook 40 may have a complementary shape to part of the shape of the outer side 58 of the nudge bar 38 such that the tow hook 40 nestles to the nudge bar 38 when in the retracted position. As such, the tow hook 40 is disposed between the nudge bar 38 and the cover 36 when the cover 36 is in the use position.

Figure 4:
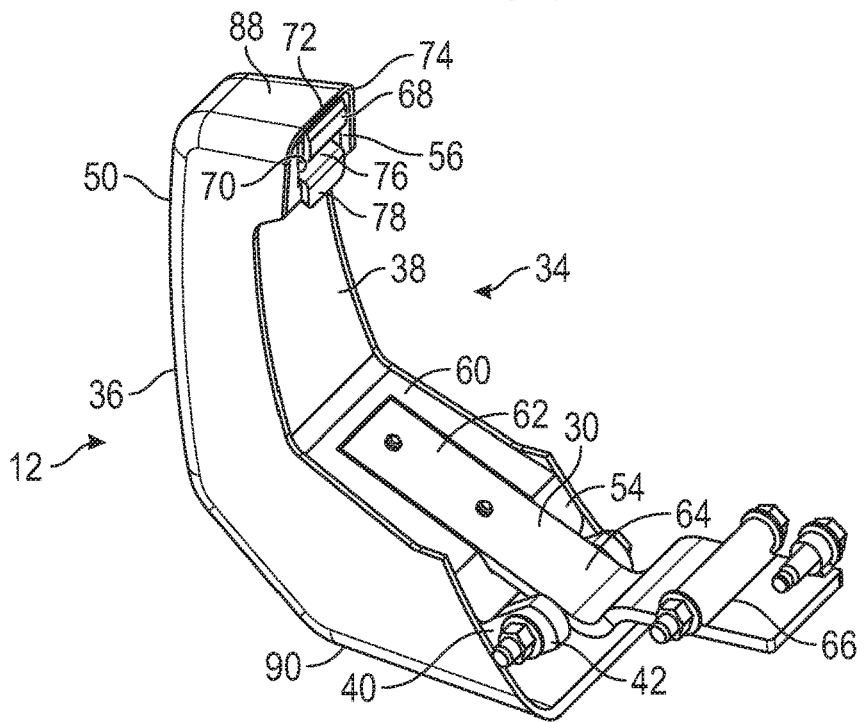
FIG. 4 is a schematic perspective view of the nudge bar and the tow hook from an inner side of the nudge bar, with the cover in the use position.

Referring to FIGS. 3 and 4, the support 30 may include a second attachment portion 64 spaced from the first attachment portion 62, and the tow hook 40 is attached to the support 30 at the second attachment portion 64. Generally, the first attachment portion 62 of the support 30 is disposed farther from the frame 28 than the second attachment portion 64 of the support 30. Furthermore, the second attachment portion 64 is configured to allow the tow hook 40 to move between the retracted and deployed positions. The first attachment portion 62 is configured to fix the nudge bar 38 to the support 30.

Continuing with FIGS. 3 and 4, the support 30 may include a third attachment portion 66 spaced from the first and second attachment portions 62, 64. The third attachment portion 66 is configured to fix the support 30 to the frame 28. Therefore, the second attachment portion 64 is disposed between the first and third attachment portions 62, 66 of the support 30.

Next the details of features that provide the attaching and detaching of the cover 36 from the nudge bar 38 are discussed. Referring to FIGS. 3-5, the cover 36 may include a first cover attachment feature 68, and the accessory 34 may include a first accessory attachment feature 70. The first cover attachment feature 68 and the first accessory attachment feature 70 engage each other to secure the cover 36 to the accessory 34. In certain configurations, the first cover attachment feature 68 of the cover 36 may include a tab 68, and the first accessory attachment feature 70 of the accessory 34 defines a first recess 70. The tab 68 engages the accessory 34 in the first recess 70 when the cover 36 is in the use position. In certain configurations, the nudge bar 38 defines the first recess 70.

Continuing with FIGS. 3-5, the cover 36 may include a hinge 72 that allows movement of the tab 68. Specifically, the hinge 72 allows the tab 68 to change positions relative to the pocket 48 of the cover 36. The hinge 72 may be disposed at a top edge 74 of the cover 36 where the external and internal sides 50, 52 come together. The tab 68 may be disposed in a first position (see FIG. 5) before attaching the cover 36 to the accessory 34 such that the tab 68 is spaced from the pocket 48, and the tab 68 may be rotated relative to the hinge 72 to a second position (see FIGS. 3 and 4) that engages the accessory 34 to secure the cover 36 to the accessory 34. When the tab 68 is in the second position, the tab 68 is partially disposed in the pocket 48.

In certain configurations, the tab 68 may include a movable portion 76 and a grip 78. The grip 78 is configured to be used to move the tab 68 between the first and second positions. The movable portion 76 may be biasable to engage and disengage the accessory 34. The movable portion 76 may be arcuate to provide the biasing feature. For example, when the tab 68 is in the second position, the grip 78 may be pushed to compress or bias the movable portion 76 inside the first recess 70 which disengages the tab 68 from the nudge bar 38, and then the tab 68 may be rotated to the first position. This type of configuration of the first cover attachment feature 68 may be referred to as a snap feature on a living hinge 72.

Furthermore, the tab 68 may include an extension 80 that protrudes outwardly from one side of the movable portion 76, and the nudge bar 38 may include a shoulder 82 disposed in the first recess 70. The extension 80 engages the shoulder 82 to attach the tab 68 to the cover 36. Therefore, the shoulder 82 acts as a catch for the tab 68. When the tab 68 is in the second position, the shoulder 82 is disposed between the extension 80 and the grip 78. Optionally, the nudge bar 38 may define a hole 84 that connects to the first recess 70. Therefore, in certain configurations, the hole 84 may be defined through the outer side 58 of the nudge bar 38, and the first recess 70 may be defined through the inner side 60 of the nudge bar 38. As such, the first recess 70 and the hole 84 may cooperate to present a through-hole in the nudge bar 38.

Continuing with FIGS. 3-5, the cover 36 may include a second cover attachment feature 86 spaced from the first cover attachment feature 68. Generally, the first cover attachment feature 68 is disposed along a top 88 of the cover 36 and the second cover attachment feature 86 is disposed along a bottom 90 of the cover 36. The first and second cover attachment features 68, 86 protrude into the pocket 48 when the cover 36 is in the use position. The second cover attachment feature 86 also protrudes into the pocket 48 when the cover 36 is in the removed position. Simply stated, the second cover attachment feature 86 protrudes into the pocket 48 regardless of the position the cover 36 is in.

The accessory 34 may include a second accessory attachment feature 92 spaced from the first accessory attachment feature 70. Generally, the first accessory attachment feature 70 is disposed along the distal end 56 of the nudge bar 38 and the second accessory attachment feature 92 is disposed along the proximal end 54 of the nudge bar 38.

The second cover attachment feature 86 and the second accessory attachment feature 92 engage each other to secure the cover 36 to the accessory 34. In certain configurations, the second cover attachment feature 86 of the cover 36 may include a protrusion 86, and the second accessory attachment feature 92 of the accessory 34 defines a second recess 92. Therefore, when the cover 36 includes the tab 68 and the protrusion 86, the tab 68 and the protrusion 86 are spaced from each other. Furthermore, when the accessory 34 defines the first recess 70 and the second recess 92, the recesses 70, 92 are spaced from each other. In certain configurations, the distal end 56 of the nudge bar 38 defines the first recess 70, and the proximal end 54 of the nudge bar 38 defines the second recess 92.

The protrusion 86 engages the accessory 34 in the second recess 92 when the cover 36 is in the use position. The protrusion 86 may be configured to provide a friction fit with the nudge bar 38 inside the second recess 92. Furthermore, the protrusion 86 of the cover 36 is disposed through the opening 46 of the loop 44 when the cover 36 is in the use position. It is to be appreciated that the second recess 92 may also provide one of the attachment points between the nudge bar 38 and the support 30.

Also, in certain configurations, the first recess 70 is defined via the inner side 60 of the nudge bar 38, and the second recess 92 is defined via the outer side 58 of the nudge bar 38. Therefore, the first and second recess 92 may be disposed along opposite sides of the nudge bar 38. As such, in certain configurations, when the first cover attachment feature 68 includes the tab 68, the tab 68 may protrude in a first direction to a distal point 94A inside the pocket 48; and when the second cover attachment feature 86 includes the protrusion 86, the protrusion 86 may protrude in a second direction to a distal point 94B inside the pocket 48. The first and second directions are different from each other. The distal point 94A of the tab 68 may be defined by the movable portion 76.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An accessory assembly for a bumper region of a vehicle, the accessory assembly comprising:
   a support disposed in the bumper region;
   an accessory mounted to the support and the accessory is accessible from the bumper region;
   a cover attached to the accessory to conceal the accessory in a use position, and the cover is detachable from the accessory to provide access to the accessory in a removed position;
   wherein the accessory includes a nudge bar fixed to the support, and the cover conceals the nudge bar when in the use position;
   wherein the accessory includes a tow hook attached to the support, and the cover conceals the tow hook when in the use position;
   wherein the nudge bar includes an outer side and an inner side opposing the outer side;
   wherein the support and the nudge bar are fixed together along the inner side; and
   wherein the tow hook is disposed along the outer side of the nudge bar.

2. The accessory assembly as set forth in claim 1 wherein the support includes a first attachment portion, and the nudge bar is fixed to the support at the first attachment portion.

3. The accessory assembly as set forth in claim 2 wherein the support includes a second attachment portion spaced from the first attachment portion, and the tow hook is attached to the support at the second attachment portion.

4. The accessory assembly as set forth in claim 3 wherein the tow hook includes an attachment end and a loop that extends outwardly from the attachment end, and wherein the tow hook is attached to the support at the attachment end.

5. The accessory assembly as set forth in claim 1 wherein the tow hook is disposed adjacent to the outer side of the nudge bar when the tow hook is in a retracted position, and the tow hook is movable away from the outer side of the nudge bar when the cover is in the removed position such that the tow hook is in a deployed position.

6. The accessory assembly as set forth in claim 1 wherein the cover includes a first cover attachment feature, and the accessory includes a first accessory attachment feature, and the first cover attachment feature and the first accessory attachment feature engage each other to secure the cover to the accessory.

7. The accessory assembly as set forth in claim 6 wherein the cover includes a second cover attachment feature spaced from the first cover attachment feature, and the accessory includes a second accessory attachment feature spaced from the first accessory attachment feature, and the second cover attachment feature and the second accessory attachment feature engage each other to secure the cover to the accessory.

8. The accessory assembly as set forth in claim 7 wherein the first cover attachment feature of the cover includes a tab, and the first accessory attachment feature of the accessory defines a first recess, and wherein the tab engages the accessory in the first recess when the cover is in the use position.

9. The accessory assembly as set forth in claim 8 wherein the second cover attachment feature of the cover includes a protrusion, and the second accessory attachment feature of the accessory defines a second recess, and wherein the protrusion engages the accessory in the second recess when the cover is in the use position.

10. The accessory assembly as set forth in claim 9 wherein:
the nudge bar includes a proximal end fixed to the support and a distal end spaced from the support; and
the distal end of the nudge bar defines the first recess, and the proximal end of the nudge bar defines the second recess.

11. The accessory assembly as set forth in claim 10 wherein:
the tow hook includes a loop defining an opening; and
the protrusion of the cover is disposed through the opening when the cover is in the use position.

12. The accessory assembly as set forth in claim 1 wherein the cover defines a pocket that conceals both of the nudge bar and the tow hook when in the use position.

13. The accessory assembly as set forth in claim 12 wherein:
the cover includes an external side and an internal side opposing the external side;
the internal side defines the pocket;
the cover includes a first cover attachment feature and a second cover attachment feature spaced from each other; and
the first and second cover attachment features protrude into the pocket when the cover is in the use position.

14. The accessory assembly as set forth in claim 13 wherein:

the first cover attachment feature includes a tab that protrudes in a first direction to a distal point inside the pocket;
the second cover attachment feature includes a protrusion that protrudes in a second direction to a distal point inside the pocket; and
the first and second directions are different from each other.

15. A vehicle bumper accessory assembly comprising:
a bumper defining an accessory region;
a support disposed in the accessory region of the bumper;
an accessory mounted to the support and the accessory is accessible outside of the bumper;
a cover attached to the accessory in a use position to conceal the accessory when the accessory is not in use, and the cover is detachable from the accessory in a removed position to reveal the accessory and provide access to use the accessory;
wherein:
the accessory includes a nudge bar fixed to the support, and the cover conceals the nudge bar when in the use position;
the support includes a first attachment portion, and the nudge bar is fixed to the support at the first attachment portion;
the accessory includes a tow hook attached to the support, and the cover conceals the tow hook when in the use position;
the support includes a second attachment portion spaced from the first attachment portion, and the tow hook is attached to the support at the second attachment portion; and
the tow hook includes an attachment end and a loop that extends outwardly from the attachment end, and wherein the tow hook is attached to the support at the attachment end.

16. The vehicle bumper accessory assembly as set forth in claim 15 wherein:
the cover includes a tab and a protrusion spaced from each other;
the accessory defines a first recess and a second recess spaced from each other;
the tab engages the accessory in the first recess when the cover is in the use position; and
the protrusion engages the accessory in the second recess when the cover is in the use position.

17. The vehicle bumper accessory assembly as set forth in claim 15 wherein
the cover defines a pocket that conceals both of the nudge bar and the tow hook when in the use position.

18. An accessory assembly for a bumper region of a vehicle, the accessory assembly comprising:
a support disposed in the bumper region;
an accessory mounted to the support and the accessory is accessible from the bumper region;
a cover attached to the accessory to conceal the accessory in a use position, and the cover is detachable from the accessory to provide access to the accessory in a removed position;
wherein:
the cover includes a first cover attachment feature, and the accessory includes a first accessory attachment feature, and the first cover attachment feature and the first accessory attachment feature engage each other to secure the cover to the accessory;
the cover includes a second cover attachment feature spaced from the first cover attachment feature;

the accessory includes a second accessory attachment feature spaced from the first accessory attachment feature, and the second cover attachment feature and the second accessory attachment feature engage each other to secure the cover to the accessory;

the first cover attachment feature of the cover includes a tab;

the first accessory attachment feature of the accessory defines a first recess, and the tab engages the accessory in the first recess when the cover is in the use position;

the second cover attachment feature of the cover includes a protrusion;

the second accessory attachment feature of the accessory defines a second recess, and the protrusion engages the accessory in the second recess when the cover is in the use position;

the accessory includes a nudge bar concealed via the cover when in the use position;

the nudge bar includes a proximal end fixed to the support and a distal end spaced from the support; and the distal end of the nudge bar defines the first recess, and the proximal end of the nudge bar defines the second recess.

19. The accessory assembly as set forth in claim 18 wherein:

the accessory includes a tow hook concealed via the cover when in the use position;

the tow hook includes a loop defining an opening; and the protrusion of the cover is disposed through the opening when the cover is in the use position.

20. The accessory assembly as set forth in claim 19 wherein:

the cover defines a pocket that conceals both of the nudge bar and the tow hook when in the use position; and the protrusion protrudes into the pocket.

* * * * *